(12) United States Patent
Astorg et al.

(10) Patent No.: US 11,807,125 B2
(45) Date of Patent: Nov. 7, 2023

(54) METHOD FOR OPTIMALLY MANAGING THE CHARGING OF A FLEET OF ELECTRIC VEHICLES

(71) Applicant: Nissan Motor Co., Ltd., Yokohama (JP)

(72) Inventors: Marine Astorg, Paris (FR); Pierre Nicolas, Wissous (FR)

(73) Assignee: Nissan Motor Co., Ltd., Yokohama (JP)

(*) Notice: Subject to any disclaimer, the term of this patent is extended or adjusted under 35 U.S.C. 154(b) by 424 days.

(21) Appl. No.: 17/298,056

(22) PCT Filed: Nov. 21, 2019

(86) PCT No.: PCT/EP2019/082121
§ 371 (c)(1),
(2) Date: May 28, 2021

(87) PCT Pub. No.: WO2020/114795
PCT Pub. Date: Jun. 11, 2020

(65) Prior Publication Data
US 2022/0118875 A1    Apr. 21, 2022

(30) Foreign Application Priority Data
Dec. 4, 2018 (FR) ...................................... 1872263

(51) Int. Cl.
*B60L 53/63* (2019.01)
*B60L 53/66* (2019.01)
(Continued)

(52) U.S. Cl.
CPC ................ *B60L 53/63* (2019.02); *B60L 53/66* (2019.02); *B60L 58/13* (2019.02); *B60L 55/00* (2019.02);
(Continued)

(58) Field of Classification Search
CPC .......... B60L 53/63; B60L 53/66; B60L 53/13; B60L 2240/80; B60L 2270/10; B60L 55/00
(Continued)

(56) References Cited

U.S. PATENT DOCUMENTS 11,201,491 B2 * 12/2021 Kearns ...................... H02J 7/02
2012/0249068 A1 * 10/2012 Ishida ...................... B60L 55/00
320/109

FOREIGN PATENT DOCUMENTS

EP    2928721 B1    2/2018
FR    2999032 A1    6/2014

* cited by examiner

*Primary Examiner* — Nathaniel R Pelton
(74) *Attorney, Agent, or Firm* — Global IP Counselors, LLP

(57) ABSTRACT

A method is performed for optimizing the management of the charge of a set of electric batteries, where each battery is recharged during a time interval during which it is connected to an electricity distribution network, according to a charge profile provided by a charge aggregator, by applying, under the control of a charge manager of the battery, a charging power level. The method involves determining, on the aggregator side, as a charge profile, a distribution curve of the charge per day over a given period of time, defined for all the batteries solely according to constraints specific to the network, transmitting the charge distribution curve to each charge manager and, on the charge manager side, adapting the received charge distribution curve to the time interval during which the battery is connected to the network and to the associated charging power level.

8 Claims, 3 Drawing Sheets

(51) Int. Cl.
  *B60L 58/13* (2019.01)
  *B60L 55/00* (2019.01)
(52) U.S. Cl.
  CPC ....... *B60L 2240/80* (2013.01); *B60L 2270/10* (2013.01)
(58) Field of Classification Search
  USPC .......................................................... 320/109
  See application file for complete search history.

METHOD FOR OPTIMALLY MANAGING THE CHARGING OF A FLEET OF ELECTRIC VEHICLES

CROSS-REFERENCE TO RELATED APPLICATIONS

This application is a U.S. national stage application of International Application No. PCT/EP2019/082121, filed on Nov. 21, 2019.

BACKGROUND

Technical Field

The subject of the invention is a method for optimally managing the charging of a set of electric batteries for supplying power to electrical consumers. The invention is especially, but not exclusively, applicable to the optimization of the charging of traction batteries of a fleet of electric or rechargeable-hybrid vehicles.

Background Information

At the present time, many ways of reconciling the needs of electric vehicles and those of the electricity distribution grid with a view to obtaining an optimized charging profile have already been imagined. To have a substantial impact on the needs of the grid, certain smart-recharging solutions employ aggregation, charging of many electric vehicles being controlled at the same time. Current solutions conventionally take into account the daily mobility requirements of a given vehicle, and the constraints of the electricity distribution grid, to achieve an optimization, over the day, of the charging of vehicle batteries connected to the grid, so as to meet the same mobility requirement each day.

More precisely, the aggregator, which is connected to the electricity distribution grid, is designed to receive, in real-time, the needs of the electricity distribution grid, the daily mobility requirements of all the electric vehicles controlled by the aggregator and the current state of the controlled electric vehicles (state of charge, status of connection to the device for electrically recharging the battery, etc.). On the basis of all this information, the aggregator is able to compute optimal charging profiles for each vehicle and to transmit them to battery managers located on-board the vehicles, which managers are intended to control the charging of the batteries.

Such a method is especially known from the example that document EP Patent No. 2 928 721 B1 gives thereof, the latter describing a method for managing charging of a set of traction batteries of electric vehicles, this method being based on a coordination of the charging of all of the batteries. More precisely, a battery-charging manager associated with each battery is provided so as to establish a two-way communication with an aggregator implemented in the electricity distribution grid, so as to allow, for each battery to be charged, an optimal charging profile to be determined by taking into account an electrical consumption signal delivered by the aggregator, which is intended to indicate a profile of the overall electrical consumption envisaged from the electricity distribution grid, this profile resulting from individual charging-profile choices specific to each battery, iteratively sent by each battery manager to the aggregator. Thus, the aggregator receives, in real-time, the charging requirements of the batteries of all the vehicles and sends charging orders to each battery manager depending on the state of the grid.

This aggregating method however has many drawbacks. In particular, it is based on two-way communication between the aggregator and the battery managers located on-board the electric vehicles. It thus requires many exchanges of data, this resulting in substantial deployment costs associated with the servers and with the telecommunication means required to enable communication between the aggregator, the grid and the battery managers located on board the vehicles. It is also constraining for the drivers of the electric vehicles, who must know in advance their mobility requirements and transmit them to the aggregator.

It may furthermore lead to large amounts of power being drawn from the grid since the aggregators connected to the grid often reason on an "all or nothing" basis and initiate charging of all the electric vehicles that they control at the moments that are the most advantageous thereto (the least expensive for example), this being a source of a substantial discontinuity in consumption from the grid.

Moreover, in the current context of consensus around global warming, the decrease in emissions of carbon dioxide ($CO_2$) is a major challenge, standards becoming increasingly demanding in this regard. Thus, the price of electricity is highly correlated to the $CO_2$ emissions that result from the generation of the electricity. The increasingly great integration, into electricity distribution grids, of renewables (solar power, wind power, etc.) is having a favorable impact on the decrease in $CO_2$ emissions. However, since renewables are by nature intermittent, the $CO_2$ emissions associated with the generation of electricity vary greatly from one day to the next. It therefore turns out that the definition of a charging profile of a fleet of vehicles based on a given mobility requirement taken into account each day is unsuitable for periods of integration of renewables into the grid and, in particular, is not optimal with respect to adapting charging to certain constraints of the network such as $CO_2$ emissions.

SUMMARY

Thus, one aim of the invention is to provide a method for managing the charging of a set of electric batteries, which is exempt from at least one of the aforementioned limitations.

To this end, the invention relates to a method for optimally managing the charging of a set of electric batteries for supplying power to electrical consumers, in which each of the electric batteries is recharged during at least one time interval during which it is connected to an electricity distribution grid, according to a charging profile supplied by a charging aggregator, by applying, under the control of a charging manager associated with each of the electric batteries, a charging power level associated with the time interval. According to the invention:
- on aggregator side, the charging profile is defined to be a curve of distribution of charging per day over a given time period, defined for all the batteries solely depending on constraints specific to the electricity distribution grid comprising at least the power available on the grid;
- from the aggregator to each charging manager, the charge distribution curve is transmitted; and,
- charging manager side, the received charge distribution curve is adapted to the at least one time interval during which the battery is connected to the grid for its recharge and to the associated charging power level.

By constraints specific to the electricity distribution grid, what is meant is parameters such as available power, the price of the electricity or even environmental generation constraints, and not any user-related constraints (vehicle, fleet vehicles, domestic wiring, etc.).

Advantageously, the charging and discharging moments each battery through the grid are controlled by monitoring the charge distribution curve.

Advantageously, the charging profile is determined depending on CO2 emissions associated with the generation of electricity on the electricity distribution grid over the given period.

Preferably, a model for predicting CO2 emissions is received, from which model an average of the CO2 emissions over the given period and an average of the CO2 emissions per day are deduced and the level of the CO2 emissions at a time t is compared to the average of the CO2 emissions per day, so that the charging profile is adapted to command charging only at moments when the level of CO2 emissions is below the average per day.

Preferably, the charge distribution curve is computed in percent of charge with respect to time for a given sampling increment, for example every quarter of an hour.

Advantageously, the given time period corresponds to a time period of one week.

Advantageously, a coefficient representative of a percentage to be reached per day with respect to a flexibility range permitted by the charging manager, which range is defined depending on the nominal capacity of the battery and on a minimum state of charge desired per day, is determined for all the batteries, and a daily target state of charge to be reached is computed depending on the coefficient and on the minimum desired state of charge per day.

Advantageously, the charging power level during each time interval is determined on the basis of a comparison between the daily target state of charge to be reached and a current state of charge of the battery.

Advantageously, the percentage to be reached per day with respect to the flexibility range permitted by the charge manager varies inversely with the level of the CO2 emissions associated with the generation of electricity on the electricity distribution grid over the given period.

The set of batteries consists of traction batteries of a fleet of electric or rechargeable-hybrid vehicles.

Other features and advantages of the invention will become apparent from the non-limiting description that is given thereof below, by way of indication, with reference to the appended drawings.

DETAILED DESCRIPTION OF EMBODIMENTS

Figure 1:
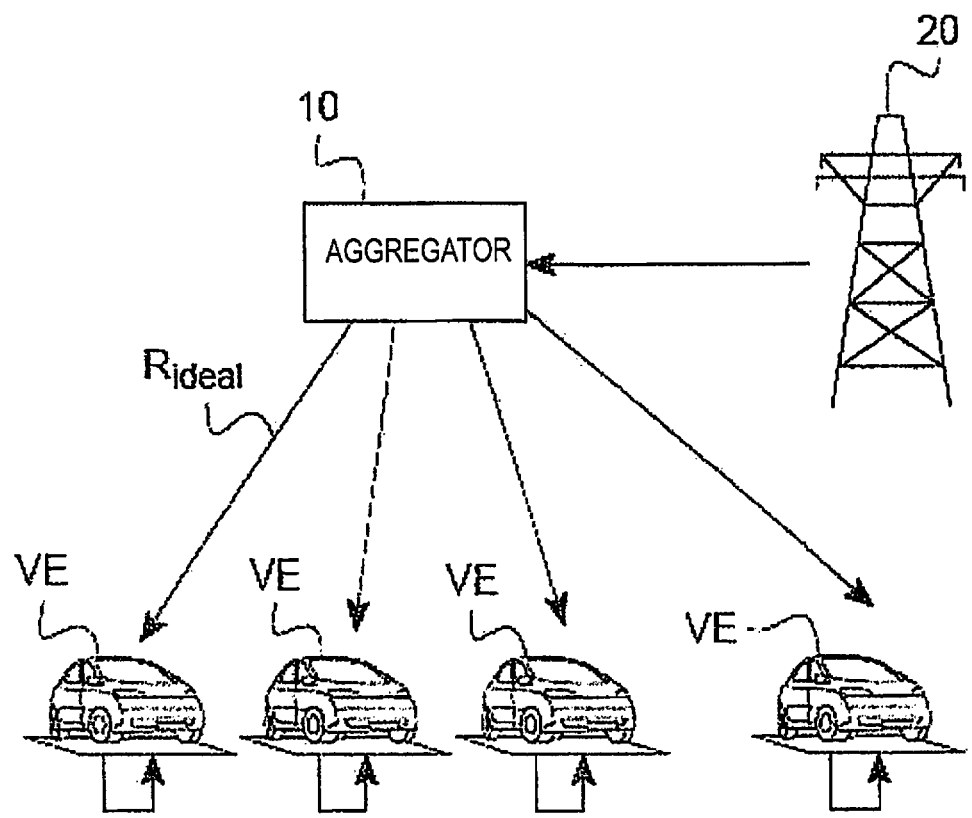
FIG. 1 illustrates a system for optimally managing charging of electric vehicles according to the present invention.

FIG. 1 schematically illustrates a set of electric vehicles VE each equipped with a traction battery and with an associated charging manager that is suitable for being connected to an electricity distribution grid 20. The charging of this set of electric vehicles VE is controlled by an aggregator 10, which is connected to the electricity distribution grid 20, to which the batteries are connected in a phase of charging thereof. The aggregator 10 is for example a dedicated server of a motor-vehicle manufacturer programmed to be able to communicate remotely with the vehicles of the manufacturer, for example via an over-the-air (OTA) communication. Thus, each of the vehicles VE possesses a communication module, for example a GSM module, allowing a communication, via a communication network, with the server 10 that forms the aggregator.

The aggregator is also designed to take into account the state of the electricity distribution grid 20, and in particular, as will be seen in more detail below, moments at which the power available on the grid is at least partially low-carbon, i.e. at which the generated power available on the grid is at least partially from low-carbon power sources, wind turbines or solar power plants for example.

The method of the invention is firstly based on determination of an ideal profile of charging over the day $R_{ideal}$. This charging profile $R_{ideal}$ is computed by the aggregator 10 for all the vehicles VE controlled thereby and is defined as being the distribution of charging over each day, over a given time period, depending on constraints specific to the electricity distribution grid. This distribution of charging per day $R_{ideal}$ is computed in percentage of charge with respect to time for a given sampling increment, for example every quarter of an hour, for a given period of several days, one week for example.

The percentages of charge per given sampling increment may either be positive, meaning that the corresponding moment is propitious for the grid to deliver power to charge the battery, or negative, meaning that the corresponding moment is instead propitious to returning the energy stored in the battery to the electricity distribution grid, if the battery of the vehicle is connected to a reversible charging device.

Figure 2:
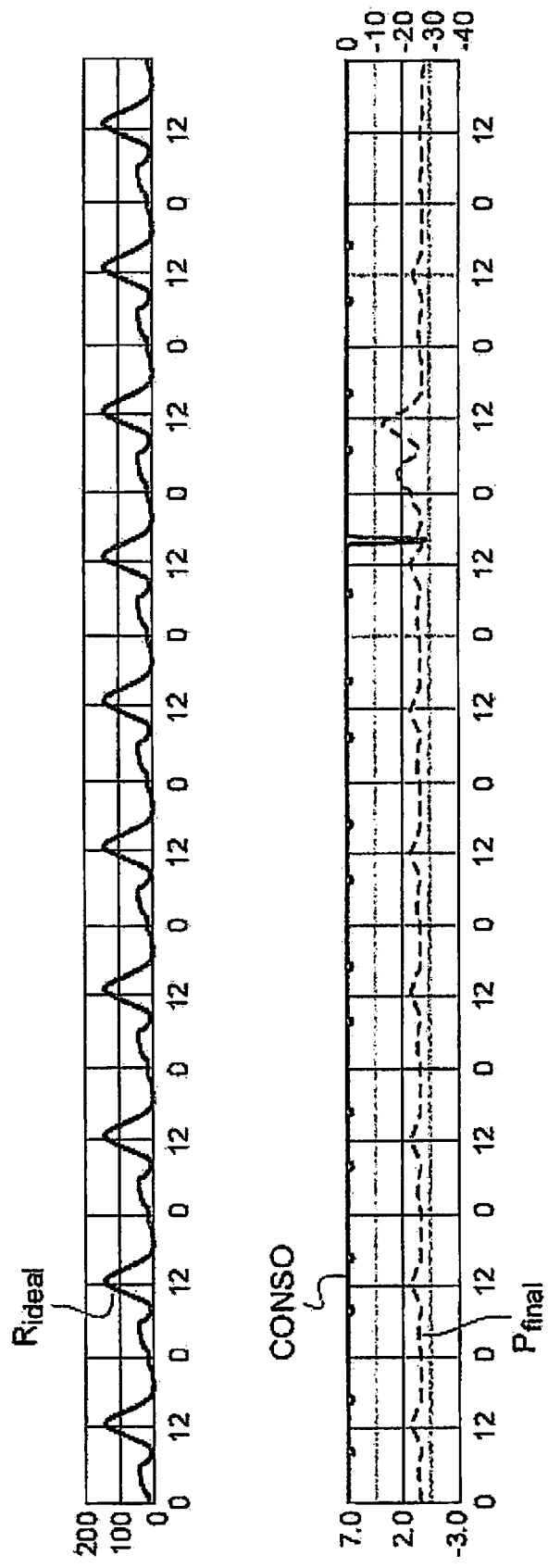
FIG. 2 shows a graph illustrating a charging law implemented vehicle-end, the law being obtained by employing the method for managing charging according to the present invention.

FIG. 2 illustrates an example of a curve of distribution of charging per day thus computed for all of the vehicles, which corresponds to the optimal charging profile over the day in percentage per quarter of an hour $R_{ideal}$, such as the profile is sent by the aggregator 10 to the vehicles VE.

The charging managers associated with the batteries of the various electric vehicles VE comprise software means for executing an algorithm for adapting this curve $R_{ideal}$ to the specific needs of the user of the vehicle and, in particular, to take into account moments at which the vehicle is connected to the network and the connection power available to it for charging. In other words, the charging orders intended for the batteries are not sent by the aggregator 10 but are generated locally by the charging manager associated with the battery, depending on the aggregated charge distribution curve as a function of time, which meets solely the needs of the electricity distribution grid, the curve being adapted, by each charging manager, depending on the moments of connection of the battery and on the power level of the charging. In yet other words, at the side of the aggregator 10, i.e. aggregator side, the needs of the users of the electric vehicles are ignored. In particular, the mobility requirements of users need not be known in advance, nor transmitted to the aggregator 10. This allows the exchanges of information between the aggregator 10 and the electric vehicles VE to be greatly decreased, with respect to the conventional aggregating methods used to control charging of a plurality of vehicles at the same time.

More precisely, the adapting algorithm implemented at the end of the charging manager associated with each battery, i.e. charging manager side, receives as input data the optimal profile of charging over the day $R_{ideal}$ in percentage per quarter of an hour, according to the example, and data representative of the mobility requirements of the user of the vehicle. These data representative of the mobility requirements of the user may take the form of a state of charge called the desired state of charge of the battery $SOC_{desired}$, which may for example correspond to a minimum state of charge to be reached each day, typically at the end of the night, for example at six o'clock in the morning, knowing that this state of charge will be able to be exceeded. The charging manager also receives as input data the nominal capacity of the battery $E_{max}$ (in kWh). For example, a user with a battery the nominal capacity of which is equal to 60 kWh, will possibly believe that with a stored energy level of 30 kWh, this corresponding to a state of charge of 50%, he will be able to make most of the journeys he wants to. He will thus possibly set his desired state of charge $SOC_{desired}$ to 50%, thus leaving the charging manager associated with the battery a flexibility range of 30 kWh, for example, as will be described in more detail below, to perform the CO2 optimization, or in other words to take advantage of charging ranges that are optimal from a point of view of the availability of low-carbon power on the electricity distribution grid.

The charging manager of the battery will also receive as input data a coefficient representative of a percentage to be reached per day with respect to this flexibility range. In other words, according to the example given above, the coefficient K will indicate the percentage to be reached each day in the 30 kWh of flexibility permitted by the charging manager.

On the basis of these input data, the algorithm for adapting the curve $R_{ideal}$ is designed to compute a daily target state of charge $SOC_{target}$, then the target energy $E_{target}$ to be reached depending on this daily target state of charge:

$$SOC_{target}=SOC_{desired}+K(1-SOC_{desired}) \quad \text{Math. 1}$$

$$E_{target}=SOC_{target}*E_{max} \quad \text{Math. 2}$$

At each time, the charging manager associated with the battery computes a difference $\Delta E$ between a current energy level of the battery $E_t$ and the target energy value of the day such as computed beforehand:

$$\Delta E=E_{target}-E_t \quad \text{Math. 3}$$

To adapt its own charging curve with respect to its times of connection and its charging power, the adapting algorithm uses proportional-integral regulation of the difference $\Delta E$.

$$E_{delta}=\Delta E*(1+k*\int \Delta E), \text{ with } k\text{=integral coefficient.} \quad \text{Math. 4}$$

Thus, when the regulated difference $E_{delta}$ is positive, this means that the desired state of charge has not been reached and, thus, the adapting algorithm must command the battery to be charged as soon as the state of the network (resulting from the ideal charging profile $R_{ideal}$ sent to the vehicle) allows it. In contrast, when $E_{delta}$ is negative, this means that the battery has exceeded the desired state of charge and it is therefore necessary to command the battery to discharge to the grid at propitious moments, such as indicated by the ideal charging profile $R_{ideal}$.

The adapting algorithm then deduces, from the difference $E_{delta}$, the charging power level $P_{charge}$ to be applied to the battery, via the following strategy:

If $E_{delta}>0$, then (case where the battery must be charged):

If $R_{ideal}>0$, then $P_{charge}=E_{delta}*R_{ideal}$

Else $P_{charge}=0$

Else if $E_{delta}\leq 0$, then (case where the battery must be discharged):

If $R_{ideal}<0$, then $P_{charge}=-E_{delta}*R_{ideal}$

Else $P_{charge}=0$. \quad Math. 5

All that there remains to do, to determine the charging power $P_{final}$ to be applied in the end, is to take into account the moments at which the battery is connected to the electricity distribution grid and the power constraints in terms of the minimum and maximum charging powers $P_{min}$ and $P_{max}$ of the battery of the vehicle:

If $|P_{charge}|>P_{min}$, then:

If the vehicle is not connected then $P_{final}=0$

Else:

If $P_{charge}>0$ then $P_{final}=\min(P_{charge},P_{max})$

Else $P_{final}=\max(P_{charge},-P_{max})$ \quad Math. 6

Else $P_{final}=0$.

Thus, a charging law that follows, as much as possible, the ideal charging profile $R_{ideal}$ received as input, without discontinuity in the amounts of charging power drawn from the grid, is obtained while needing to know nothing about how the vehicle will be used. As illustrated in FIG. 2 by curves representative of the consumption of the vehicle CONSO in kWH and of the charging power $P_{final}$ in kW resulting from the charging law set by the adapting algorithm, it may be seen, on the one hand, that the battery is indeed charged and discharged at the propitious moments indicated by the signal of the ideal charging profile $R_{ideal}$ and, on the other hand, that a higher consumption than usual, symbolized by the consumption peak in the signal CONSO, will lead to greater charging of the battery.

Management of charging is thus advantageously carried out in open loop: the charging profile computed by the aggregator allows an optimal control law to be defined, i.e. an ideal charging profile to be followed each day over a period of several days, taking into account solely constraints specific to the grid, and not feedback from end users (status of connection of the battery to the grid, current state of charge of the batteries, etc.), this ideal charging profile being transmitted to the charging managers associated with the batteries, which locally control the system for charging the battery. At regular intervals, for example once per week, a new control law is recomputed taking into account the state of the grid.

Advantageously, as indicated above in the description, it is possible to take into account an ideal charging profile computed on the basis of the CO2 emissions associated with the generation of the power available on the grid, to manage the phases of charging and discharging of the battery of vehicles connected to the grid and, in particular, to charge batteries more in periods in which the power available on the grid is the result of electrical power generation with low emissions of CO2.

Thus, in this context, which is the to be of optimization of CO2 emissions, it is recommendable for the ideal charging profile delivered by the aggregator 10 to also depend on the CO2 emissions associated with the generation of the electricity available on the electricity distribution grid 20. Thus, the aggregator 10 advantageously receives as input, with a view to establishing the ideal charging profile $R_{ideal}$, a model predicting the CO2 emissions (or the price of the electricity, the latter being highly correlated to the CO2 emissions of the electricity generation) over a relatively long time period, typically over several days and preferably over one week. Specifically, the presence of two distinct periods in the variation in the CO2 emissions of electricity generation have been observed, namely a period of daily variation, which corresponds to the period of generation of solar power by photovoltaic solar plants connected to the grid, and a period of weekly variation, which corresponds to the period of generation of wind power by wind turbines connected to the grid. Thus, taking a model predicting CO2 emissions over several days and preferably over one week into account in the computation of the on-grid charging profile that is ideal for all the vehicles allows variations in the CO2 emissions of electricity generation and especially those associated with the electricity generated by wind turbines to be better integrated into the ideal charging profile $R_{ideal}$. The model predicting CO2 admissions may for example be deduced by the aggregator from various sources of data, including metrological data (insolation, etc.), on which the generation of low-carbon electrical power in a given region depends.

The model predicting CO2 emissions associated with the generation of the power available on the grid for example delivers a CO2-emission value every 15 minutes during a time of one week and therefore delivers a CO2-emission prediction indicator structured in the form of a vector containing 672 components.

Initially, the daily target state of charge $SOC_{target}$ will be computed depending on the coefficient K, so as to allow the percentage of the flexibility range that the battery of the vehicle must reach, to charge more on days with low CO2 emissions, to be computed.

To do this, on the basis of the CO2 prediction provided as input, on the one hand the average of the CO2 emissions over the week $CO2_{week-avg}$ and on the other hand the average of the CO2 emissions per day $CO2_{day-avg}$ are computed for all the vehicles.

The integral $I_{CO2}$ of the difference between these values is computed:

$$I_{CO2} = \int (CO2_{week-avg} - CO2_{day-avg}) \quad \text{Math. 7}$$

and the maximum and minimum values $I_{CO2max}$, $I_{CO2min}$ that the integral thus computed may take are determined:

$$I_{CO2max} = \max(I_{CO2})$$

$$I_{CO2min} = \min(I_{CO2}). \quad \text{Math. 8}$$

The coefficient K representative of the percentage of the permitted flexibility range that it is desired to reach is then deduced for each day of the week:

$$K = \frac{I_{CO2} - I_{CO2min}}{I_{CO2max} - I_{CO2min}} \quad \text{Math. 9}$$

This coefficient K is identical for all the vehicles.

As explained above, this coefficient is then applied to the mobility requirements of each user, these requirements being defined in the form of a state of charge referred to as the desired state of charge of the battery $SOC_{desired}$, in order to deduce therefrom the daily target state of charge $SOC_{target}$ to be reached:

$$SOC_{target} = SOC_{desired} + K(1 - SOC_{desired}). \quad \text{Math. 10}$$

Thus, on days on which the power available on the grid corresponds to high CO2 emissions, the daily target state of charge $SOC_{target}$ to be reached will be equal to the desired state of charge of the battery $SOC_{desired}$, i.e. to the state of charge that the user desires to obtain at his departure time. In contrast, on days on which the power available on the grid corresponds to low CO2 emissions, the daily target state of charge $SOC_{target}$ to be reached will be higher. The battery is therefore charged more on days with low CO2 emissions.

Figure 3:
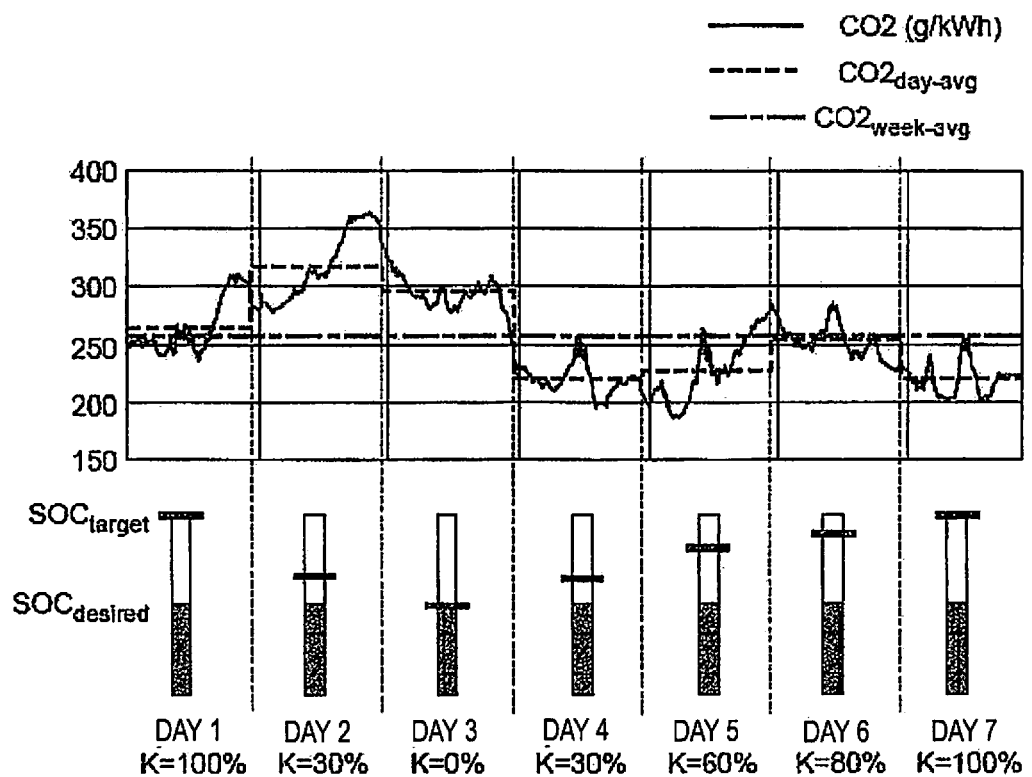
FIG. 3 shows a graph illustrating an example of variation over a week in a daily target state of charge to be reached, as a function of a percentage to be reached of a permitted flexibility range taking into account the variation in the CO2 emissions in the generation of electricity on the grid.

FIG. 3 illustrates an example of variation over a week in the daily target state of charge $SOC_{target}$ to be reached, in the form of histograms, as a function of the percentage K of the flexibility range to be reached, which percentage is computed each day according to the principles exposed above, on the basis of the values of the average of the CO2 emissions over the week $CO2_{week-avg}$ and of the average of the CO2 emissions per day $CO2_{day-avg}$. In FIG. 3, the portion of each daily histogram shaded in gray represents the desired state-of-charge level $SOC_{desired}$, and the portion of each histogram that is not shaded in gray represents the permitted flexibility range that results therefrom with respect to the nominal capacity of the battery, the location of the daily target state of charge $SOC_{target}$ to be reached, which is symbolized by the horizontal line, in this flexibility range depending on the value of the coefficient K, which may take values between 0% and 100% depending on the level of any CO2 emissions.

In the same way, to compute the ideal distribution of charging over the day, the level of the CO2 emissions at a time t $CO2_{current}$ is compared to the average of the CO2 emissions per day $CO2_{day-avg}$, so as to allow charging to be requested only at moments when the level of the CO2 emissions is below average. Thus, the following is computed:

$$\Delta_{CO2\_day} = CO2_{day-avg} - CO2_{current}. \quad \text{Math. 11}$$

Subsequently, the distribution is normalized:

$$R_{fleet} = \frac{\Delta_{CO2\_day}}{\frac{\int \text{abs}(\Delta_{CO2\_day})}{2}}. \quad \text{Math. 12}$$

Thus, a charging profile $R_{fleet}$ equivalent to the ideal charging profile $R_{ideal}$ but computed on the basis of CO2 emissions is obtained. This charging profile $R_{fleet}$ is then defined to be the charging distribution per day over a week, in percentage per quarter of an hour (or another sampling increment), computed on the basis of CO2 emissions, as explained above. The sum of all the (positive and negative) percentages over the day must be equal to 0. This ideal charging profile corresponds to the profile to be followed by all of the vehicles in order to achieve the daily target state of charge $SOC_{target}$.

Figure 4:
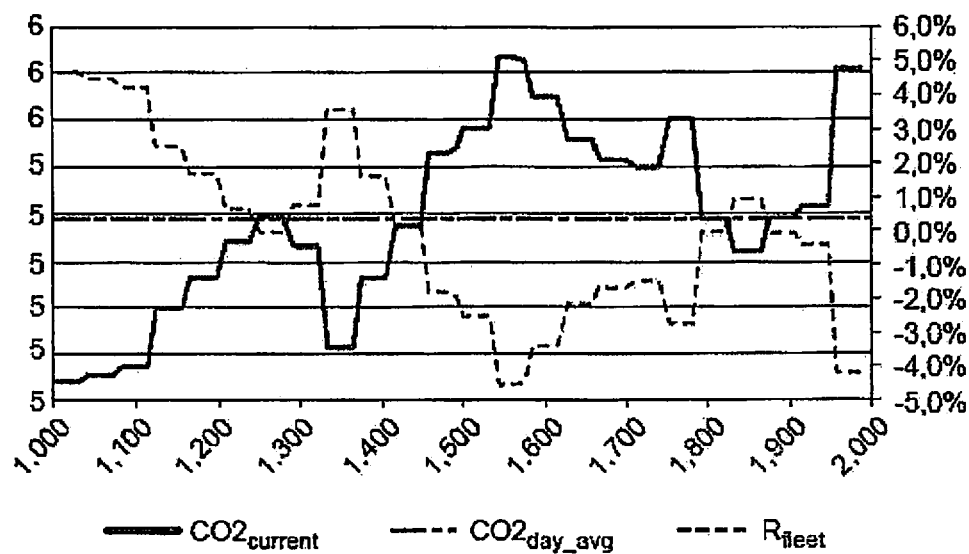
FIG. 4 shows a graph illustrating an example of an ideal charging profile to be followed by all of the vehicles in order to reach the daily target state of charge.

FIG. 4 is a graph illustrating an example of such a charging distribution over one day. When the level of the CO2 emissions at a time t $CO2_{current}$ is lower than the average over the day of the CO2 emissions $CO2_{day-avg}$, the signal $R_{ideal}$ corresponds to a positive percentage of charge, meaning that the moment is propitious to charging if the battery is connected to the grid with a view to recharging thereof. In contrast, when the level of the CO2 emissions at a time t $CO^2_{current}$ rises above the average over the day of the CO2 emissions $CO2_{day-avg}$, the signal $R_{fleet}$ corresponds to a negative percentage of charge, meaning that the moment is instead propitious to returning energy stored in the battery to the electricity distribution grid, if the battery of the vehicle is connected to a reversible charging device. The percentage of charge per quarter of an hour in absolute value increases as the difference between the level of the CO2 emissions at a time t $CO2_{current}$ and the average over the day of the CO2 emissions $CO2_{day\text{-}avg}$ increases.

Control over several days and preferably over one week of the daily state of charge to be reached, i.e. of the daily charging target defined depending on the mobility requirements of the user, advantageously makes it possible to take maximum advantage of the electrical power made available to the grid by wind turbines and solar power plants. This allows the battery to be charged at moments that are optimal, both from the point of view of CO2 emissions but also from an economical point of view, these two factors being highly correlated.

Moreover, this method may be easily adapted to the needs of grid managers. Specifically, it is enough to adapt the scale of the model used to predict CO2 emissions to obtain, for example, control on a scale corresponding to a district, allowing congestion of the grid to be avoided, or to return to a model predicting CO2 emissions on a national scale to balance demand. It is also possible to use this method on the scale of an installation to optimize self-consumption.

The input model used to predict CO2 emissions with a view to determining the optimal charging profile allows the charging manager associated with each battery to compute charging requests for each vehicle of the set of electric vehicles, this allowing the moments most propitious to charging to be monitored without creating any discontinuity in the consumption from the electricity distribution grid and therefore without creating any additional disruption to the electricity grid, and all this to be achieved while taking into account CO2-emission differences related to the generation of electricity over several days.

The charging profile $R_{fleet}$ computed beforehand is advantageously the charging profile to be followed by all the vehicles, in particular when it is a question of a large set of vehicles. However, as a variant, for a smaller set of vehicles, the impact of which on the electricity distribution grid will be smaller, it may be more advantageous to seek to concentrate charging times at times determinable as being the most advantageous from the point of view of CO2 emissions and thus from an economical point of view. To do this, an ideal charging profile, referred to as the "concentrated" charging profile $R_{fleet\_concentrated}$, able to define these charging times, is defined by applying the following method:

$$\text{If } R_{fleet} > 0 \text{ then } R_{fleet\_concentrated} = \frac{R_{fleet}}{\frac{1-C}{\max(R_{fleet})} * R_{fleet} + C} \quad \text{Math. 13}$$

$$\text{Else } R_{fleet\_concentrated} = \frac{R_{fleet}}{\frac{1-C}{\min(R_{fleet})} * R_{fleet} + C}$$

with c being a concentration coefficient comprised between 1 and Infinity (defined depending on the size of the set of vehicles). When c=1, no concentration is applied and $R_{fleet\_concentrated} = R_{fleet}$.

Once again, the distribution is normalized:

If $R_{fleet\_concentrated} > 0$ then:

$R_{fleet\_concentrated\_pos} = R_{fleet\_concentrated}$ $R_{fleet\_concentrated\_neg} = 0$ If $R_{fleet\_concentrated} < 0$ then:

$R_{fleet\_concentrated\_pos} = 0$ $R_{fleet\_concentrated\_neg} = R_{fleet\_concentrated}$ \quad Math. 14

The final charging profile $R_{fleet\text{-}final}$ is then deduced for the set of vehicles:

$$\text{If } R_{fleet\_concentrated} > 0 \text{ then: } R_{fleet\_final} = \frac{R_{fleet\_concentrated\_pos}}{\int R_{fleet\_concentrated\_pos}} \quad \text{Math. 15}$$

$$\text{Else, } R_{fleet\_final} = \frac{R_{fleet\_concentrated\_neg}}{\int R_{fleet\_concentrated\_neg}}.$$

Thus, for a set containing few vehicles, a high concentration coefficient c will be chosen as this will allow the vehicles to be charged at times that are the most advantageous from the point of view of CO2 emissions, a veritable grid discontinuity not being created because of the small impact that a small number of vehicles has with respect to overall power consumption. The larger the set of vehicles, the lower the concentration coefficient c, thus allowing grid constraints to be met as well as can be.

The invention claimed is:

1. A charging method for optimally managing charging of at least one set of electric batteries for supplying power to electrical consumers, in which each of the batteries is recharged for at least one time interval during which it is connected to an electricity distribution grid, according to a charging profile supplied by a charging aggregator, by applying, under a control of a charging manager associated with each of the batteries, a charging power level associated with the time interval, the charging method comprising:

on the aggregator side, determining the charging profile to be a curve of distribution of charging per day over a given time period, defined for all the batteries solely depending on constraints specific to the electricity distribution grid comprising at least the power available on the electricity distribution grid;

transmitting the charge distribution curve from the aggregator to each charging manager, and the charge distribution curve received on the charging manager side includes the at least one time interval during which the battery is connected to the grid and to the associated charging power level;

determining for all of the batteries a coefficient representative of a percentage to be reached per day with respect to a flexibility range permitted by the charging manager, the range is defined depending on a nominal capacity of the battery and on a minimum state of charge desired per day, and computing a daily target state of charge to be reached depending on the coefficient and on the minimum state of charge desired per day; and controlling charging and discharging moments of each of the batteries through the electricity distribution grid by monitoring the charge distribution curve.

2. The charging method as claimed in claim 1, wherein the determining of the charging profile depends on CO2 emissions associated with the generation of electricity on the electricity distribution grid over the given period.

3. The charging method as claimed in claim 2, further comprising receiving a prediction model for CO2 emissions from which model an average of the CO2 emissions over the given period and an average of the CO2 emissions per day are deduced and the level of the CO2 emissions at a time is compared to the average of the CO2 emissions per day, so that the charging profile is adapted to command charging only at moments when the level of $CO_2$ emissions is below the average per day.

4. The charging method as claimed in claim 1, wherein the charge distribution curve is calculated in a percentage of charge with respect to time for a given sampling increment.

5. The charging method as claimed in claim 1, wherein the given time period corresponds to a time period of one week.

6. The charging method as claimed in claim 1, wherein the charging power level during each time interval is determined based on a comparison between the daily target state of charge to be reached and a current state of charge of the battery.

7. The charging method as claimed in claim 1, wherein the percentage to be achieved per day with respect to the flexibility range authorized by the charge manager varies inversely with the level of the $CO_2$ emissions associated with the generation of electricity on the electricity distribution grid over the given period.

8. The charging method as claimed in claim 1, wherein the set of batteries consists of traction batteries of a fleet of electric or rechargeable-hybrid vehicles.

\* \* \* \* \*